(12) United States Patent
Kang

(10) Patent No.: US 11,050,914 B1
(45) Date of Patent: Jun. 29, 2021

(54) CAMERA MODULE

(71) Applicant: Samsung Electro-Mechanics Co., Ltd., Suwon-si (KR)

(72) Inventor: Jin Yong Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/844,185

(22) Filed: Apr. 9, 2020

(30) Foreign Application Priority Data

Jan. 20, 2020 (KR) .................. 10-2020-0007299

(51) Int. Cl.
| | | |
|---|---|---|
| *H04N 5/225* | (2006.01) | |
| *G02B 7/09* | (2021.01) | |
| *H04N 5/232* | (2006.01) | |
| *G03B 13/36* | (2021.01) | |
| *H02K 41/035* | (2006.01) | |

(52) U.S. Cl.
CPC ............ *H04N 5/2257* (2013.01); *G02B 7/09* (2013.01); *G03B 13/36* (2013.01); *H02K 41/0354* (2013.01); *H04N 5/2254* (2013.01); *H04N 5/23212* (2013.01); *H04N 5/23258* (2013.01)

(58) Field of Classification Search
CPC .............. H04N 5/2257; H04N 5/2254; H04N 5/23212; H04N 5/23258; G02B 7/09; H02K 41/0354; G03B 13/36
See application file for complete search history.

(56) References Cited

U.S. PATENT DOCUMENTS

| | | | | |
|---|---|---|---|---|
| 10,382,687 | B1* | 8/2019 | Patel | G02B 27/64 |
| 10,887,518 | B2* | 1/2021 | Min | H04N 5/23258 |
| 2006/0285840 | A1* | 12/2006 | Takahashi | G02B 27/646 |
| | | | | 396/55 |
| 2013/0050536 | A1* | 2/2013 | Suzuki | G02B 27/646 |
| | | | | 348/240.3 |
| 2013/0169832 | A1* | 7/2013 | Park | G02B 7/28 |
| | | | | 348/208.2 |
| 2014/0132738 | A1* | 5/2014 | Ogura | G02B 7/02 |
| | | | | 348/47 |
| 2015/0301353 | A1* | 10/2015 | Takeuchi | H04N 5/23283 |
| | | | | 359/554 |
| 2016/0165137 | A1* | 6/2016 | Kang | H04N 5/23287 |
| | | | | 348/208.4 |
| 2016/0219222 | A1* | 7/2016 | Heo | H04N 5/2254 |
| 2017/0126978 | A1* | 5/2017 | Yun | H04N 5/2254 |
| 2020/0120283 | A1* | 4/2020 | Min | G02B 7/02 |
| 2021/0096389 | A1* | 4/2021 | Kim | G02B 27/646 |

FOREIGN PATENT DOCUMENTS

| | | |
|---|---|---|
| KR | 10-2013-0077216 A | 7/2013 |
| KR | 10-2017-0019753 A | 2/2017 |
| KR | 10-2019-0065736 A | 6/2019 |

* cited by examiner

*Primary Examiner* — Abdelaaziz Tissire
(74) *Attorney, Agent, or Firm* — NSIP Law

(57) ABSTRACT

A camera module includes a first driver integrated circuit (IC) generating a driving signal to move a first lens barrel in one or more directions perpendicular to an optical axis direction, a second driver IC generating a driving signal to move a second lens barrel in one or more directions perpendicular to the optical axis direction, and a gyro sensor generating gyro data corresponding to a first address transmitted from the first driver IC, and transmitting the gyro data to the first driver IC and the second driver IC.

16 Claims, 5 Drawing Sheets

CAMERA MODULE

CROSS-REFERENCE TO RELATED APPLICATIONS

This application claims the benefit under 35 USC 119(a) of Korean Patent Application No. 10-2020-0007299 filed on Jan. 20, 2020, in the Korean Intellectual Property Office, the entire disclosure of which is incorporated herein by reference for all purposes.

BACKGROUND

1. Field

The present disclosure relates to a camera module.

2. Description of the Background

In general, portable communication terminals such as mobile phones, personal digital assistants (PDAs), portable personal computers (PCs), and the like, have recently become commonly used to transmit image data as well as text or voice data. In order to respond to this trend, to enable image data transmission, image chatting, and the like, camera modules have become standard in portable communication terminals in recent years.

In general, a camera module includes a lens barrel having a lens disposed therein and a housing accommodating the lens barrel therein, and includes an image sensor for converting an image of a subject into an electrical signal. A smartphone may employ a camera module using a short-focusing method for imaging an object with fixed focus, but recently, a camera module including an actuator capable of autofocusing (AF) adjustment has been employed according to technological developments. In addition, such a camera module may employ an actuator for an optical image stabilization (OIS) function to reduce a resolution degradation caused by shaking.

Recently, in order to implement a high performance camera function, a camera module having a plurality of lens barrels has been mounted on an electronic device. In order to improve an autofocusing function of each of the plurality of lens barrels to reduce a resolution degradation phenomenon, it has been necessary to provide different actuators to each of the plurality of lens barrels.

For stable driving of different actuators, it has been necessary to have different gyro sensors that provide gyro data to each of the different actuators. However, when the camera module is provided with a plurality of gyro sensors, there is a problem that a manufacturing cost and a size thereof may increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first driver integrated circuit (IC) generating a driving signal to move a first lens barrel in one or more directions perpendicular to an optical axis direction, a second driver IC generating a driving signal to move a second lens barrel in one or more directions perpendicular to the optical axis direction, and a gyro sensor generating gyro data corresponding to a first address transmitted from the first driver IC, and transmitting the gyro data to the first driver IC and the second driver IC.

The second driver IC may compare the first address with a second address, corresponding to required gyro data, to determine whether to store the gyro data output from the gyro sensor.

The second driver IC may store the gyro data output from the gyro sensor when the first address and the second address match.

The second driver IC may bypass storing the gyro data output from the gyro sensor when the first address and the second address do not match.

The first driver IC, the second driver IC, and the gyro sensor may be connected through a data line, the first driver IC may transmit the first address through the data line, and receive the gyro data corresponding to the first address, the gyro sensor may receive the first address through the data line, and transmit the gyro data corresponding to the first address, and the second driver IC may receive the first address and the gyro data corresponding to the first address through the data line.

The first driver IC and the gyro sensor may perform a serial peripheral interface bus (SPI) communication.

The first driver IC may operate as a master in SPI communication, and the gyro sensor may operate as a slave in SPI communication, and the second driver IC may operate as a receiver in SPI communication and receive data transmitted and received between the first driver IC and the gyro sensor.

In another general aspect, a camera module includes a gyro sensor, a first driver integrated circuit (IC) transmitting a first address, a gyro sensor receiving the first address, and transmitting gyro data corresponding to the first address in response to the received first address, and a second driver IC receiving the first address and the gyro data corresponding to the first address, and comparing the first address with a second address, corresponding to required gyro data, and determining to store the gyro data corresponding to the first address or bypass storing the gyro data corresponding to the first address in response to the comparison.

The second driver IC may include an address determination unit storing a plurality of addresses corresponding to a plurality of different types of gyro data, and determining the second address, corresponding to the required gyro data, among the plurality of stored addresses.

The second driver IC may further include an address comparison unit comparing the first address with the second address.

The second driver IC may further include a data storage unit determining whether to store the gyro data corresponding to the first address in response to a comparison result of the address comparison unit.

The data storage unit may store the gyro data corresponding to the first address when the first address and the second address match.

The data storage unit may bypass storing the gyro data corresponding to the first address when the first address and the second address do not match.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
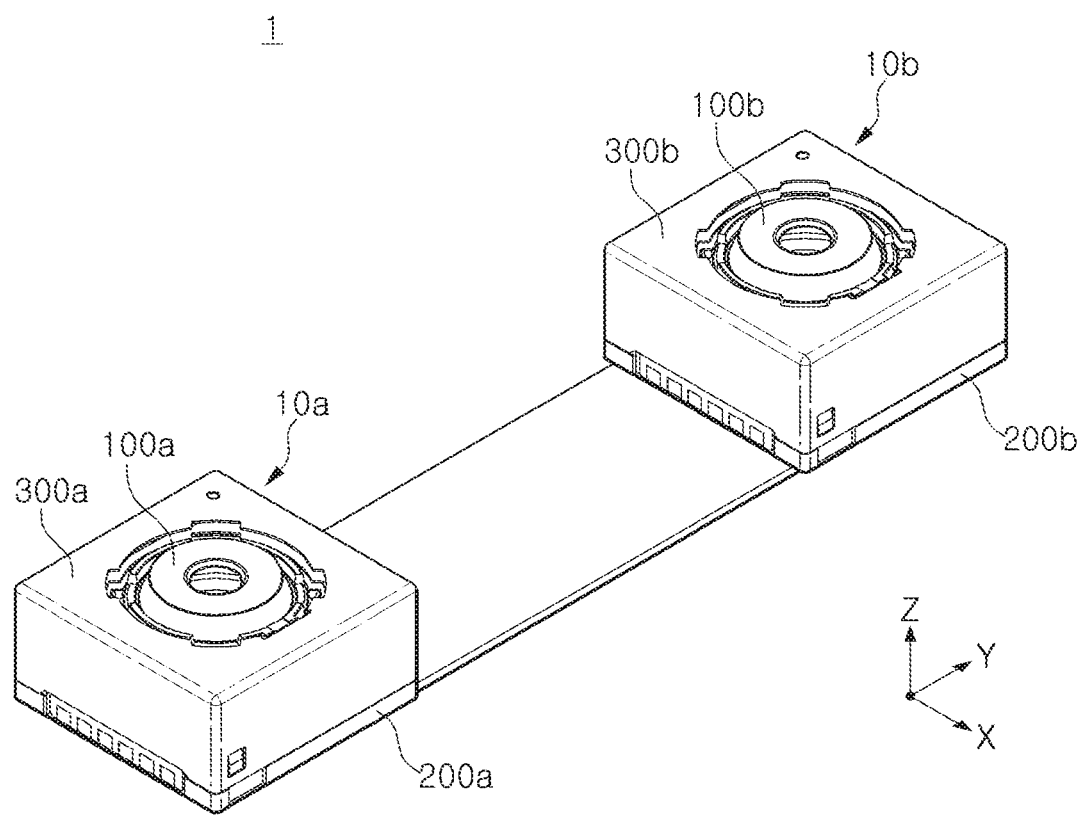
FIG. 1 is a perspective view of a camera module according to one or more examples of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is a camera module capable of sharing a gyro sensor between different driver ICs to provide gyro data to the different driver ICs.

FIG. 1 is a perspective view of a camera module according to one or more examples of the present disclosure.

Referring to FIG. 1, a camera module 1 according to an embodiment of the present disclosure may include a first camera module 10a including a first lens barrel 100a, a first housing 200a accommodating the first lens barrel 100a, and a first case 300a coupled to the first housing 200a; and a second camera module 10b including a second lens barrel 100b, a second housing 200b accommodating the second lens barrel 100b, and a second case 300b coupled to the second housing 200b.

The first camera module 10a and the second camera module 10b may be mounted on one printed circuit board, or may be mounted on different printed circuit boards according to embodiments.

Since configurations of the first camera module 10a and the second camera module 10b are similar, the first camera module 10a will mainly be described, and redundant descriptions applicable to the second camera module 10b may be omitted.

The first lens barrel 100a may be formed to have a hollow cylindrical shape, and a plurality of lenses for capturing a subject may be accommodated therein, and the plurality of lenses may be mounted on the first lens barrel 100a in an optical axis direction. As many of the plurality of lenses as necessary may be disposed according to a design of the first lens barrel 100a, and each lens may have optical characteristics such as the same or a different refractive index.

The first camera module 10a may further include an image sensor for converting light incident through the first lens barrel 100a into an electrical signal. The image sensor may be disposed below the first housing 200a. The image sensor may convert light incident through the first lens barrel 100a into an electrical signal. The image sensor may include a charge coupled device (CCD), a complementary metal-oxide semiconductor (CMOS), or the like, and combinations thereof. The electrical signal converted by the image sensor may be output as an image through a display unit of the electronic device. The image sensor may be fixed to the printed circuit board and may be electrically connected to the printed circuit board by wire bonding.

An infrared light filter may be provided above the image sensor. The infrared light filter may block light in an infrared region among light incident through the first lens barrel 100a.

The first camera module 10a may include a first actuator for driving the first lens barrel 100a in an optical axis direction and two directions perpendicular to the optical axis direction. The first actuator may include an autofocus (AF) actuator for adjusting a focus and an optical image stabilization (OIS) actuator for correcting shaking.

For example, the AF actuator may adjust the focus by moving the first lens barrel 100a in the optical axis direction (Z axis direction), and the OIS actuator may correct shaking during shooting by moving the first lens barrel 100a in two directions perpendicular to the optical axis direction (X axis direction and Y axis direction).

The first housing 200a may be formed to have open upper and lower portions, and the first lens barrel 100a and the first actuator may be accommodated in an internal space of the first housing 200a. The first case 300a may be coupled to the first housing 200a to surround the upper portion of the first housing 200a, and may protect internal components of the first camera module 10a. In addition, the first case 300a may shield electromagnetic waves so that electromagnetic waves generated by the camera module do not affect other electronic components in the electronic device. In addition, the first case 300a may shield electromagnetic waves so that electromagnetic waves generated by other electronic components do not affect the camera module.

Figure 2:
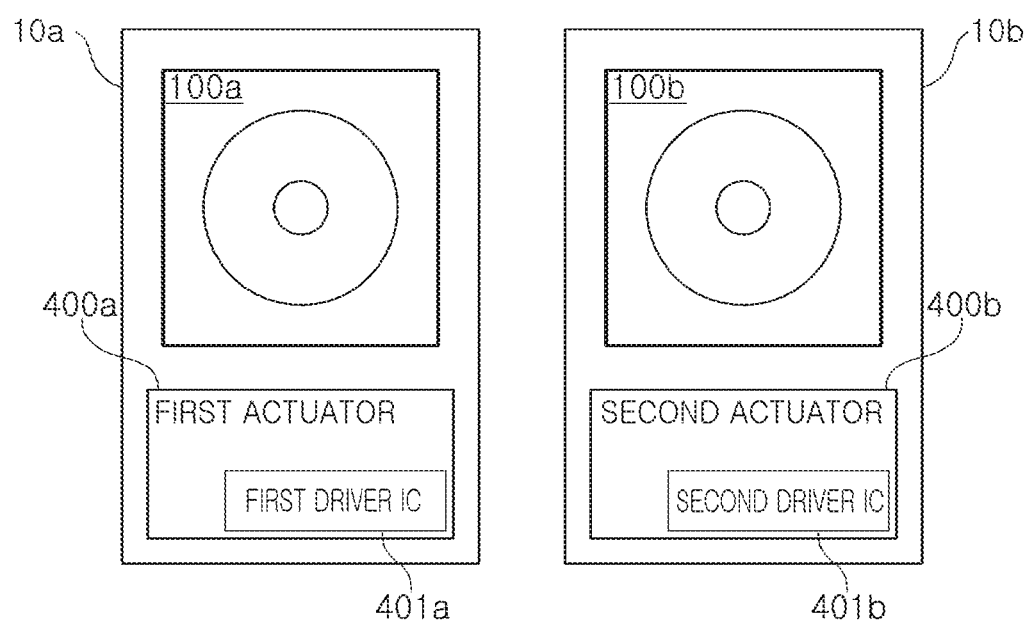
FIG. 2 is a block diagram of a camera module according to one or more examples of the present disclosure.

FIG. 2 is a block diagram of a camera module according to one or more examples of the present disclosure.

Referring to FIG. 2, a camera module 1 according to an example of the present disclosure may include a first camera module 10a including a first lens barrel 100a and a first actuator 400a for driving the first lens barrel 100a in an optical axis direction and in a direction perpendicular to the optical axis; and a second camera module 10b including a second lens barrel 100b and a second actuator 400b for driving the second lens barrel 100b in an optical axis direction and in a direction perpendicular to an optical axis. The first actuator 400a may include a first driver integrated circuit (IC) 401a, and the second actuator 400b may include a second driver IC 401b.

Figure 3:
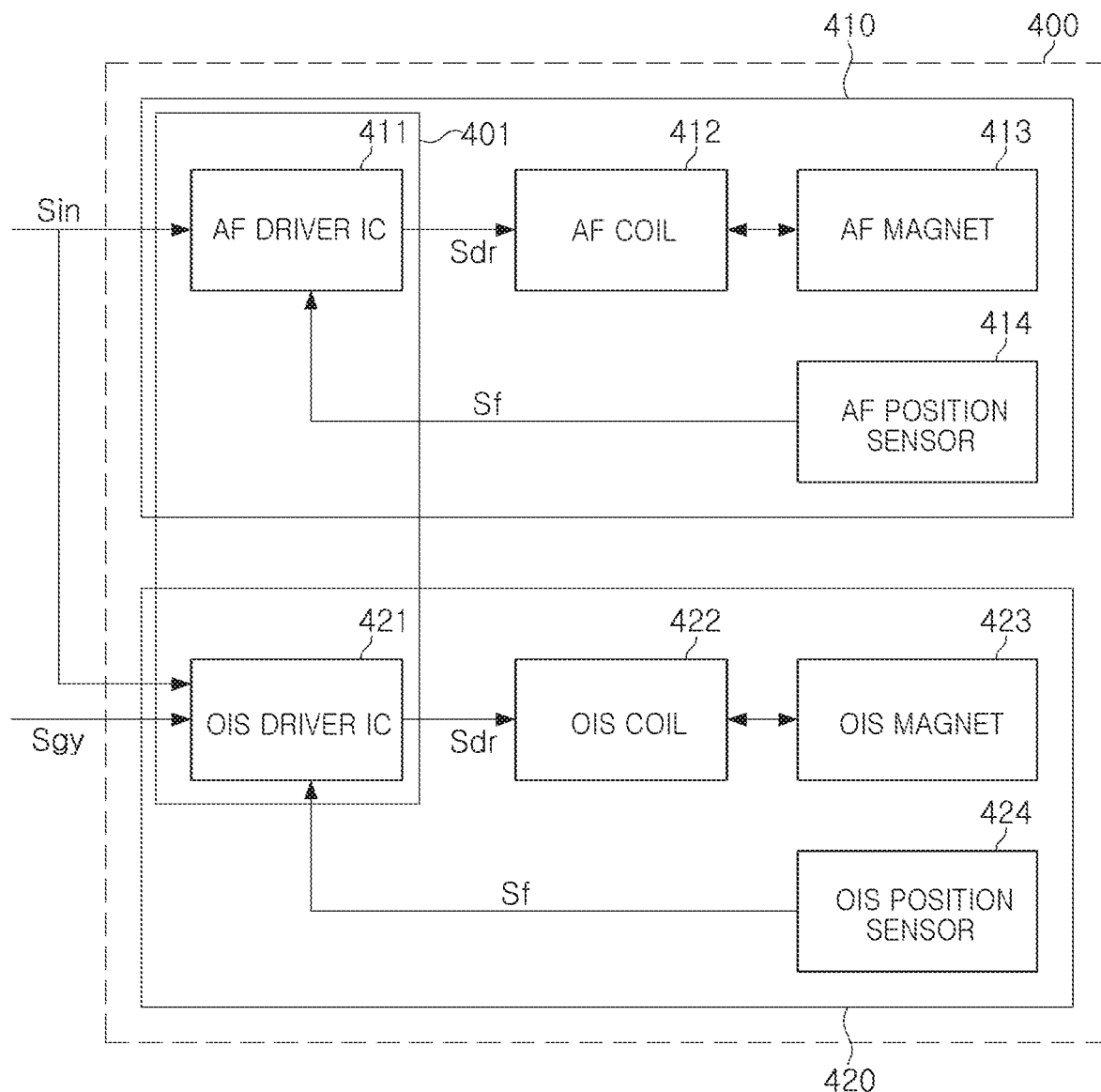
FIG. 3 is a block diagram of an actuator according to one or more examples of the present disclosure.

FIG. 3 is a block diagram of an actuator according to one or more examples of the present disclosure.

Hereinafter, a driving method of the actuator according to one or more examples of the present disclosure will be described in detail with reference to FIGS. 1 to 3.

An actuator 400 according to an example of FIG. 3 may correspond to any one of the first actuator 400a and the second actuator 400b shown in FIG. 2. Referring to FIG. 3, an actuator 400 according to an example of the present disclosure includes an AF actuator 410 and an OIS actuator 420.

The AF actuator 410 includes an AF driver IC 411, an AF coil 412, an AF magnet 413, and an AF position sensor 414, and the OIS actuator 420 includes an OIS driver IC 421, an OIS coil 422, an OIS magnet 423, and an OIS position sensor 424.

A driver IC 401 may include the AF driver IC 411 of the AF actuator 410 and the OIS driver IC 421 of the OIS actuator 420, and the driver IC 401 may correspond to any one of the first driver IC 401a and the second driver IC 401b shown in FIG. 2.

The AF driver IC 411 may generate a driving signal Sdr according to an input signal Sin and a feedback signal Sf, and may provide the generated driving signal Sdr to the AF coil 412. For example, the input signal Sin may be disposed inside an electronic device employing a camera module, and may be provided by a host that controls an overall operation of the electronic device. The input signal Sin provided to the AF driver IC 411 may include information regarding a target position in the optical axis direction of the lens barrel.

The feedback signal Sf may be provided by the AF position sensor 414 which detects a current position of the lens barrel in the optical axis direction. For example, the AF position sensor 414 may include a hall element. The AF position sensor 414 may detect the current position of the lens barrel, through a current position of the AF magnet 413.

The AF driver IC 411 may be driven in a closed loop type manner that compares the input signal Sin and the feedback signal Sf. The closed loop type AF driver IC 411 may be driven in a direction to reduce an error between a target position included in the input signal Sin and a current position detected in the feedback signal Sf. Driving in a closed loop type manner may be advantageous in that linearity, accuracy, and repeatability may be improved, compared to an open loop system.

The AF driver IC 411 may include an H bridge circuit capable of driving in both directions to provide a driving signal Sdr to the AF coil 412 in a voice coil motor manner. The driving signal Sdr may be provided to the AF coil 412 in a form of a current or a voltage.

When the driving signal Sdr is applied to the AF coil 412, a lens barrel may move in the optical axis direction due to electromagnetic influence between the AF magnet 413 and the AF coil 412. For example, the AF magnet 413 may be mounted on one side of the lens barrel, and the AF coil 412 may be mounted on the housing to face the AF magnet 413. However, according to an embodiment, the positions of the AF magnet 413 and the AF coil 412 may be changed with each other.

The OIS driver IC 421 may generate a driving signal Sdr according to an input signal Sin, a gyro signal Sgy, and a feedback signal Sf, and may provide the generated driving signal Sdr to the OIS coil 422.

For example, the input signal Sin may be disposed inside an electronic device employing a camera module, and may be provided by a host that controls an overall operation of the electronic device. The input signal Sin provided to the OIS driver IC 412 may include information regarding a target position in a direction perpendicular to the optical axis of the lens barrel.

The gyro signal Sgy may be disposed in the camera module, and may be provided by a gyro sensor that detects shaking of the camera module or the electronic device. For example, the gyro signal Sgy may include gyro data. For example, the gyro data may include acceleration data and angular velocity data detected from shaking of the camera module or the electronic device.

The feedback signal Sf may be provided by the OIS position sensor 424 which detects a current position in a direction perpendicular to the optical axis of the lens barrel. For example, the OIS position sensor 424 may include a hall element. The OIS position sensor 424 may detect the current position of the lens barrel through the current position of the OIS magnet 423.

The OIS driver IC 421 may be driven in a closed loop manner, as comparing the input signal Sin, the gyro signal Sgy, and the feedback signal Sf. The closed loop type OIS driver IC 421 may be driven in a direction reducing an error of a target position included in the input signal Sin, shaking information included in the gyro signal Sgy, and a current position detected in the feedback signal Sf. Driving in the closed loop type manner may be advantageous, in that linearity, accuracy, and repeatability may be improved, as compared to an open loop system.

The OIS driver IC 421 may include an H bridge circuit capable of being driven in both directions to provide a driving signal Sdr to the OIS coil 422 in a voice coil motor manner. The driving signal Sdr may be provided to the OIS coil 422 in a form of a current or a voltage.

When the driving signal Sdr is applied to the OIS coil 422, the lens barrel may move in a direction perpendicular to the optical axis due to the electromagnetic influence between the OIS magnet 423 and the OIS coil 422. For example, two OIS magnets 423 are provided, one OIS magnet is mounted on the lens barrel, in a first direction perpendicular to the optical axis, and the other OIS magnet is mounted on the lens barrel, in a second direction, perpendicular to the optical axis. In addition, two OIS coils 422 may be provided to each face a respective OIS magnet 423. However, in some embodiments, the positions of the OIS magnet 423 and the OIS coil 422 may be changed. For example, one or more OIS coils 422 may be disposed on the lens barrel and one or more OIS magnets 423 may be disposed to each face a respective OIS coil 422.

For stable driving of the first actuator 400a and the second actuator 400b of the camera module 1, two gyro sensors for providing gyro data to each of the first driver IC 401a and the second driver IC 401b may be required.

However, in order to reduce manufacturing costs of the camera module or the electronic device, and reduce the size, the number of gyro sensors for providing gyro data needs to be limited.

Figure 4:
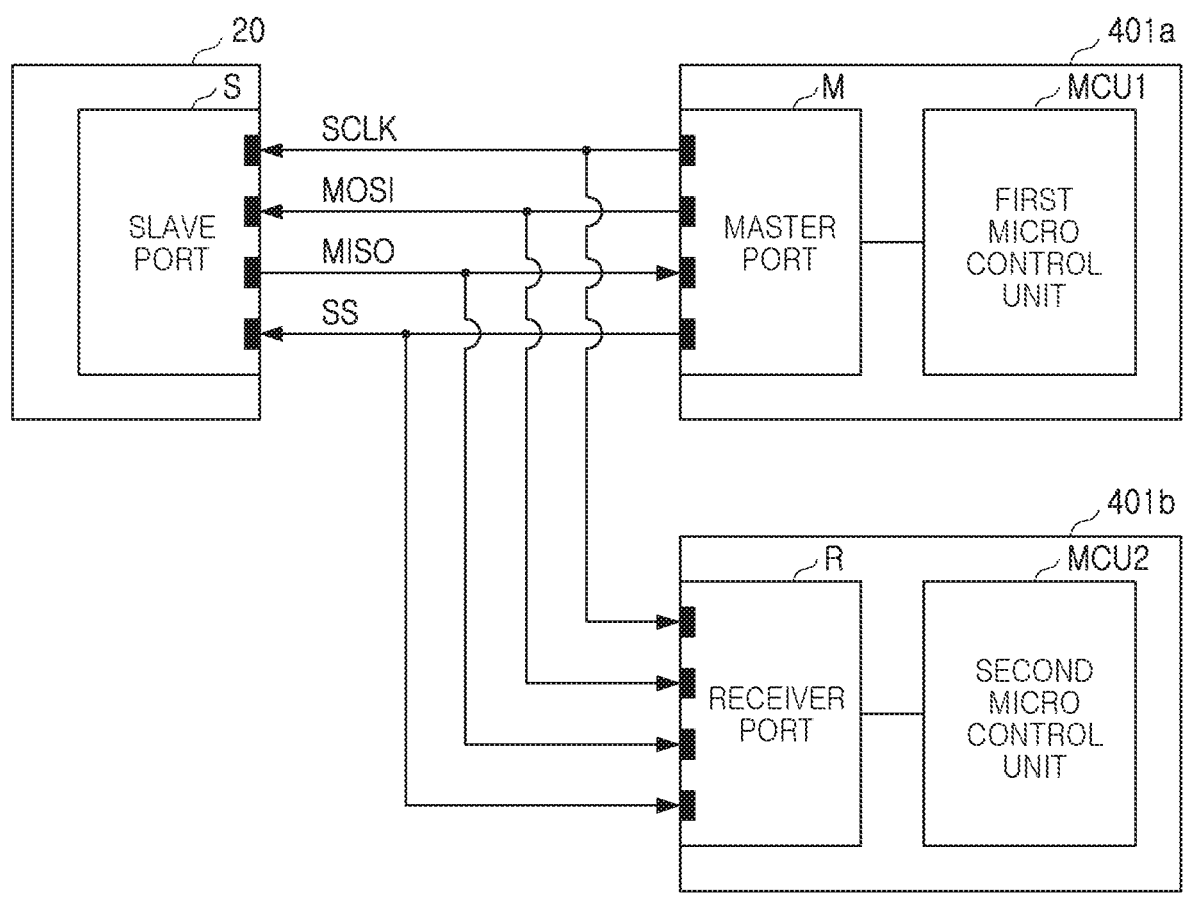
FIG. 4 is a block diagram of a first driver IC, a second driver IC, and a gyro sensor provided to illustrate a method of communicating gyro data according to one or more examples of the present disclosure.

FIG. 4 is a block diagram of a first driver IC, a second driver IC, and a gyro sensor provided to illustrate a method of communicating gyro data according to one or more examples of the present disclosure.

Referring to FIG. 4, each of the gyro sensor 20, the first driver IC 401a, and the second driver IC 401b may have a communication port, and may be connected to each other through a communication line. The gyro sensor 20 corresponds to one component of the camera module or the electronic device.

The gyro data generated by the gyro sensor 20 may be transferred to the first driver IC 401a and the second driver IC 401b. Each of the first driver IC 401a and the second driver IC 401b may perform an OIS operation by using the gyro data.

The gyro sensor 20, the first driver IC 401a, and the second driver IC 401b may be connected through a serial peripheral interface bus (SPI) communication line.

In the communication of gyro data of the first driver IC 401a and the gyro sensor 20, the first driver IC 401a operates as a master in the SPI communication, and the gyro sensor 20 operates as a slave in the SPI communication.

Here, the master in SPI communication corresponds to a subject having a control authority in the SPI communication, and the slave in the SPI communication is a subject transmitting data under a control of the master in the SPI communication, and the first driver IC 401a and the gyro sensor 20 may transmit and receive data according to a well-known method of SPI communication.

Meanwhile, the second driver IC 401b may receive data transmitted and received between the first driver IC 401a and the gyro sensor 20. Since the second driver IC 401b performs only an operation of receiving data transmitted and received between the master and the slave in the SPI communication, the second driver IC 401b may be understood as a receiver in the SPI communication.

Accordingly, the communication port of the first driver IC 401a includes a master port M, the communication port of the gyro sensor 20 includes a slave port S, and the communication port of the second driver IC 401b includes a receiver port R.

The first driver IC 401a may include a first micro control unit MCU1, and the first micro control unit MCU1 may generate a driving signal for correcting shaking of the first lens barrel 100a, according to gyro data received through the master port M.

In addition, the second driver IC 401b may include a second micro control unit MCU2, and the second micro control unit MCU2 may generate a driving signal for correcting shaking of the second lens barrel 100b, according to gyro data received through the receiver port R.

Each of the master port M, the slave port S, and the receiver port R may include a master in slave out (MISO) pin, a master out slave in (MOSI) pin, a serial clock (SCLK) pin, and a slave select (SS) pin. The MISO pin corresponds to a pin for data transmitted from the slave and received at a master/receiver, the MOSI pin corresponds to a pin for data transmitted from the master and received at a slave/receiver, the SCLK pin corresponds to a pin for a clock signal for synchronization, and the SS pin corresponds to a pin for selecting one of a plurality of slaves.

The MISO pin, the MOSI pin, the SCLK pin, and the SS pin of each of the master port M, the slave port S, and the receiver port R may be interconnected through a communication line. The communication line connected to the MISO pin and the MOSI pin may be understood as a data line. For example, the first driver IC 401a may transmit and receive data through a data line, the gyro sensor 20 may transmit and receive data through a data line, and the second driver IC 401b may receive data through a data line.

In some examples described herein, each of the master port M, the slave port S, and the receiver port R may include a serial data input output (SDIO) pin, a serial clock (SCLK) pin, and a slave select (SS) pin. Here, a communication line connected to the serial data input output (SDIO) pin may be understood as a data line.

Hereinafter, for convenience of description, an address corresponding to gyro data required for driving the first driver IC 401a is referred to as a first address, and an address corresponding to gyro data required for driving the second driver IC 401*b* is referred to as a second address.

When the first driver IC 401*a* transmits the first address of the required gyro data through the data line connected to the MOSI pin of the master port M, the gyro sensor 20 may transmit gyro data corresponding to the received first address through the data line connected to the MISO pin of the slave port S.

For example, when the first driver IC 401*a* transmits an address of X-axis gyro data among gyro data through the data line connected to the MOSI pin of the master port M, the gyro sensor 20 may transmit the X-axis gyro data corresponding to the address through the data line connected to the MISO pin of the slave port S.

That is, the first driver IC 401*a* operates as a master in SPI communication, and may transmit the first address of the required gyro data to the gyro sensor 20, and in response thereto, may receive the required gyro data.

However, referring to FIG. 4, the second driver IC 401*b* receives a first address through a data line connected to the MOSI pin of the receiver port R, and receives gyro data corresponding to the first address through the data line connected to the MISO pin of the receiver port R.

That is, since the second driver IC 401*b* only performs an operation of receiving the first address transmitted and received between the first driver IC 401*a* and the gyro sensor 20 and the gyro data corresponding thereto, and there is no function to perform an operation for requesting required gyro data, the second driver IC 401*b* needs to selectively use the received gyro data in order to generate an appropriate driving signal.

Figure 5:
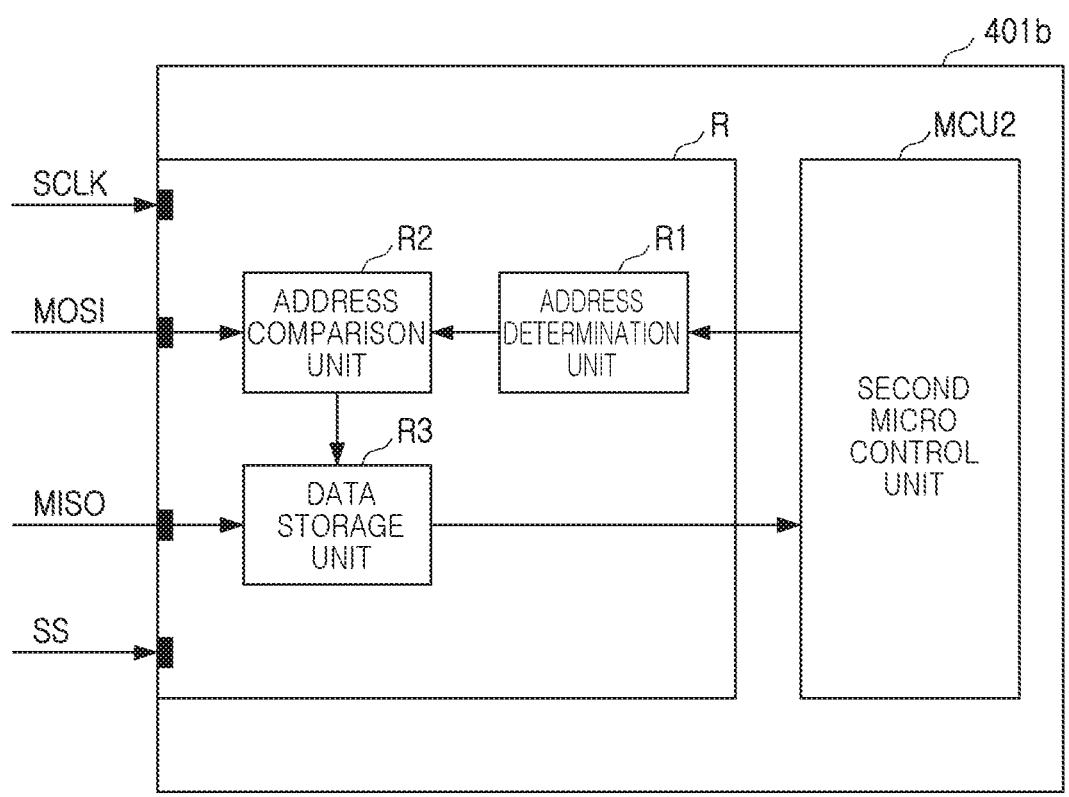
FIG. 5 is a detailed block diagram of a second driver IC according to one or more examples of the present disclosure.

FIG. 5 is a detailed block diagram of a second driver IC according to one or more examples of the present disclosure.

Referring to FIG. 5, the receiver port R of the second driver IC 401*b* may include an address determination unit R1, an address comparison unit R2, and a data storage unit R3.

The address determination unit R1 may store a plurality of addresses corresponding to a plurality of gyro data having different types from each other. For example, when the plurality of gyro data include X-axis gyro data, Y-axis gyro data, and Z-axis gyro data, the address determination unit R1 may include a plurality of addresses corresponding to each of the X-axis gyro data, the Y-axis gyro data, and the Z-axis gyro data.

The address determination unit R1 may determine a second address, corresponding to required gyro data, among the plurality of stored addresses. An address determination operation of the address determination unit R1 may be performed under a control of the second micro control unit MCU2.

The address comparison unit R2 receives a first address transmitted from the MOSI pin of the master port M provided in the first driver IC 401*a* through the MOSI pin of the receiver port R.

The address comparison unit R2 compares the first address transmitted from the first driver IC 401*a* with the second address determined by the address determination unit R1.

The data storage unit R3 receives gyro data transmitted from the MISO pin of the slave port S provided in the gyro sensor 20 through the MISO pin of the receiver port R.

The data storage unit R3 determines whether to store the gyro data transmitted from the gyro sensor 20 according to a comparison result of the first address transmitted from the first driver IC 401*a* of the address comparison unit R2 with the second address determined by the address determination unit R1.

For example, as a result of comparing the first address transmitted from the first driver IC 401*a* with second address determined by the address determination unit R1, the address comparison unit R2 transmits a data storage command to the data storage unit R3, when the first address and the second address match.

The data storage unit R3 stores the gyro data transmitted from the gyro sensor 20 and provides the stored gyro data to the second micro control unit MCU2 according to the data storage command. The second micro control unit MCU2 may generate a driving signal for correcting shaking of the second lens barrel 100*b* according to gyro data provided by the data storage unit R3.

On the contrary, when the first address and the second address do not match, the address comparison unit R2 transmits a standby command to the data storage unit R3. The data storage unit R3 may perform a standby operation without storing the gyro data transmitted from the gyro sensor 20 according to the standby command.

In the present examples, although it is described that the first driver IC 401*a* includes the master port M and the second driver IC 401*b* includes the receiver port R, however examples disclosed herein are not limited thereto, for example, the first driver IC 401*a* may include a master port M and a receiver port R that can selectively operate, the second driver IC 401*b* may include a master port M and a receiver port R that can selectively operate, such that one driver IC of the first driver IC 401*a* and the second driver IC 401*b* may operate as a master in the SPI communication, and the other driver IC may operate as a receiver in the SPI communication.

As set forth above, in a camera module or electronic device according to the examples described herein, different driver ICs may share a gyro sensor providing gyro data, thereby reducing a manufacturing cost and reducing a size of the camera module or electronic device.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A camera module, comprising:
a first driver integrated circuit (IC) generating a driving signal to move a first lens barrel in one or more directions perpendicular to an optical axis direction;
a second driver IC generating a driving signal to move a second lens barrel in one or more directions perpendicular to the optical axis direction; and a gyro sensor generating gyro data corresponding to a first address transmitted from the first driver IC, and transmitting the gyro data to the first driver IC and the second driver IC.

2. The camera module of claim 1, wherein the second driver IC compares the first address with a second address, corresponding to required gyro data, to determine whether to store the gyro data output from the gyro sensor.

3. The camera module of claim 2, wherein the second driver IC stores the gyro data output from the gyro sensor when the first address and the second address match.

4. The camera module of claim 2, wherein the second driver IC bypasses storing the gyro data output from the gyro sensor when the first address and the second address do not match.

5. The camera module of claim 1, wherein the first driver IC, the second driver IC, and the gyro sensor are connected through a data line,
wherein the first driver IC transmits the first address through the data line, and receives the gyro data corresponding to the first address,
wherein the gyro sensor receives the first address through the data line, and transmits the gyro data corresponding to the first address, and
wherein the second driver IC receives the first address and the gyro data corresponding to the first address through the data line.

6. The camera module of claim 1, wherein the first driver IC and the gyro sensor perform a serial peripheral interface bus (SPI) communication.

7. The camera module of claim 6, wherein the first driver IC operates as a master in SPI communication, and the gyro sensor operates as a slave in SPI communication, and
wherein the second driver IC operates as a receiver in SPI communication and receives data transmitted and received between the first driver IC and the gyro sensor.

8. A camera module, comprising:
a gyro sensor;
a first driver integrated circuit (IC) transmitting a first address;
the gyro sensor receiving the first address, and transmitting gyro data corresponding to the first address in response to the received first address; and
a second driver IC receiving the first address and the gyro data corresponding to the first address, and comparing the first address with a second address, corresponding to required gyro data, and determining to store the gyro data corresponding to the first address or bypass storing the gyro data corresponding to the first address in response to the comparison.

9. The camera module of claim 8, wherein the second driver IC comprises an address determination unit storing a plurality of addresses corresponding to a plurality of different types of gyro data, and determining the second address, corresponding to the required gyro data, among the plurality of stored addresses.

10. The camera module of claim 9, wherein the second driver IC further comprises an address comparison unit comparing the first address with the second address.

11. The camera module of claim 10, wherein the second driver IC further comprises a data storage unit determining whether to store the gyro data corresponding to the first address in response to a comparison result of the address comparison unit.

12. The camera module of claim 11, wherein the data storage unit stores the gyro data corresponding to the first address when the first address and the second address match.

13. The camera module of claim 11, wherein the data storage unit bypasses storing the gyro data corresponding to the first address when the first address and the second address do not match.

14. The camera module of claim 8, wherein the first driver IC, the second driver IC, and the gyro sensor are connected through a data line,
wherein the first driver IC transmits the first address through the data line, and receives the gyro data corresponding to the first address,
wherein the gyro sensor receives the first address through the data line, and transmits the gyro data corresponding to the first address, and
wherein the second driver IC receives the first address and the gyro data corresponding to the first address through the data line.

15. The camera module of claim 8, wherein the first driver IC and the gyro sensor perform a serial peripheral interface bus (SPI) communication.

16. The camera module of claim 15, wherein the first driver IC operates as a master in SPI communication, and the gyro sensor operates as a slave in SPI communication, and
wherein the second driver IC operates as a receiver in SPI communication and receives data transmitted and received between the first driver IC and the gyro sensor.

\* \* \* \* \*